United States Patent [19]
Thomas

[11] Patent Number: 6,165,354
[45] Date of Patent: Dec. 26, 2000

[54] FILTER HAVING A FILTER ELEMENT ADJUSTABLE TO A BYPASS POSITION

[75] Inventor: Allan Thomas, Wheaton, Ill.

[73] Assignee: Solberg Manufacturing, Inc., Itasca, Ill.

[21] Appl. No.: 09/314,096

[22] Filed: May 18, 1999

[51] Int. Cl.[7] .................................................. B01D 35/147
[52] U.S. Cl. ........................... 210/107; 55/301; 210/131; 210/356; 210/446
[58] Field of Search .................................... 210/130, 131, 210/354, 356, 433.1, 446, 448; 137/547; 55/309, 394

[56] References Cited

U.S. PATENT DOCUMENTS

| | | |
|---|---|---|
| 1,619,118 | 3/1927 | Guy et al. . |
| 1,805,450 | 5/1931 | Harvey . |
| 2,699,259 | 1/1955 | Birkemeier .............................. 210/164 |
| 3,355,021 | 11/1967 | Jones ....................................... 210/130 |
| 3,421,627 | 1/1969 | Lammers ................................. 210/131 |
| 3,757,951 | 9/1973 | Redenbarger et al. ................. 210/131 |
| 3,817,380 | 6/1974 | Brown ..................................... 210/131 |
| 3,819,052 | 6/1974 | Firth ......................................... 55/309 |
| 3,993,561 | 11/1976 | Swearingen ............................. 210/131 |
| 4,689,144 | 8/1987 | Holmes .................................... 210/130 |
| 5,733,443 | 3/1998 | Stamey, Jr. et al. ..................... 210/131 |

Primary Examiner—Joseph W. Drodge
Attorney, Agent, or Firm—Robert F. I. Conte; Lee, Mann, Smith, McWilliams, Sweeney & Ohlson

[57] ABSTRACT

A filter has a filter housing. An adjustable support couples a filter element to the filter housing. A first end of the adjustable support is fixedly connected to the housing. A movable portion of said adjustable support is coupled to said filter element. The movable portion is opposite the first end. The movable portion is disposed in the throat of the filter element. The filter element occupies a fluid intake position when said movable portion is in a first position. The filter element occupies a bypass position when said movable portion is in a second position.

10 Claims, 5 Drawing Sheets

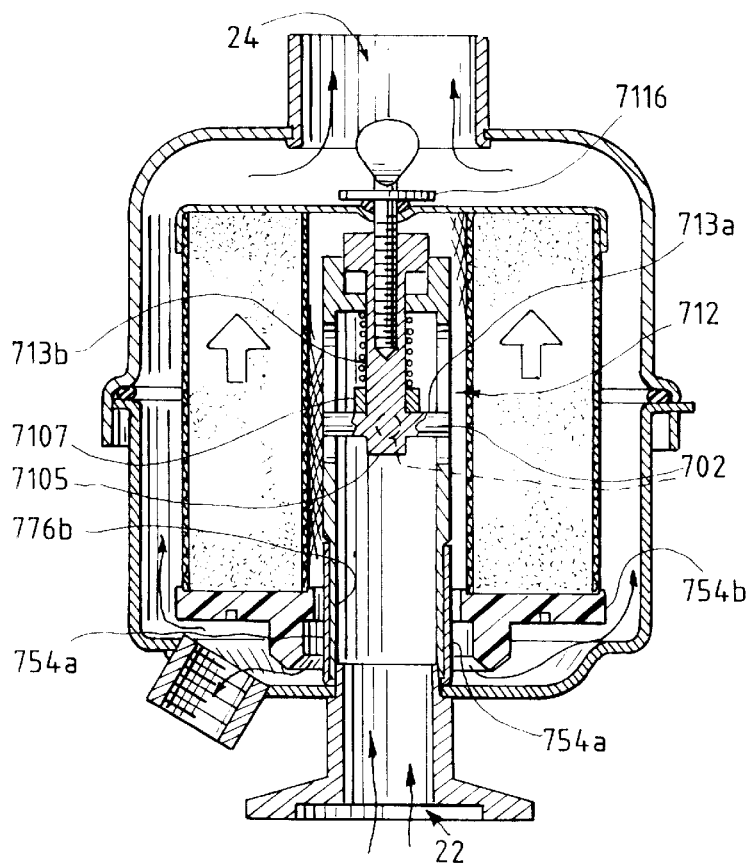
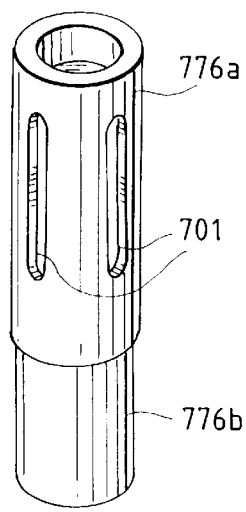
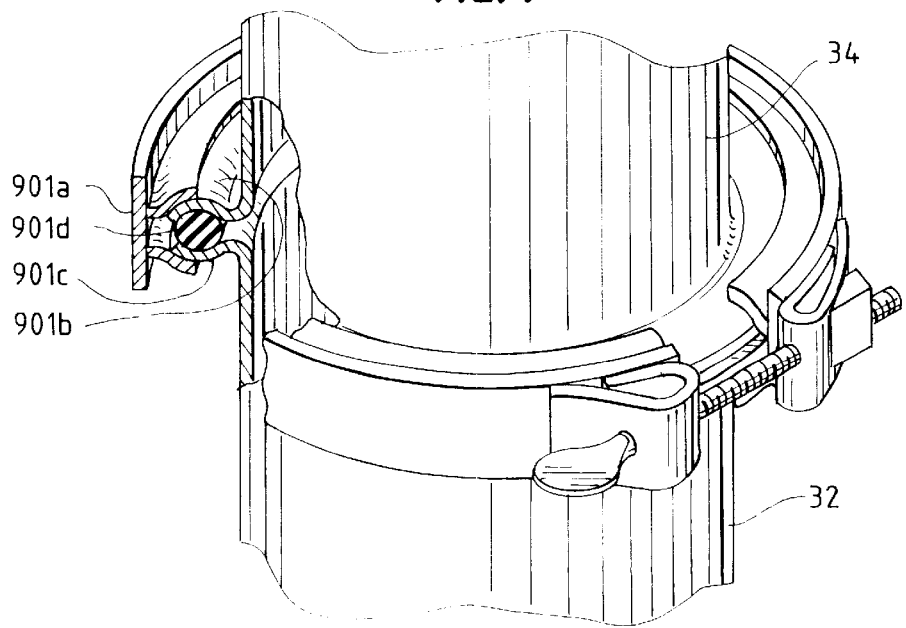

FILTER HAVING A FILTER ELEMENT ADJUSTABLE TO A BYPASS POSITION

The invention concerns a filter having a filter element which adjusts to a bypass position when the filter element becomes clogged.

BACKGROUND

Many machines require filters to separate undesirable substances from fluids traveling at various velocities and under various pressures. Examples of these types of filters include fuel filters, oil filters, vacuum pump discharge filters, and blower discharge filters. These types of filters need to have a design which ensures the filters do not interrupt fluid flow when their filter elements become clogged. Failure to allow the fluid to continue to flow could cause these filters or the machines associated with the filters to sustain damage. The damage may result in physical injury to an operator of the machine.

Industry uses a variety of mechanisms to ensure clogged filter elements do not interrupt fluid flow. Generally, each mechanism functions by creating a bypass to allow the fluid to exit the filter without passing through the filter element. U.S. Pat. No. 3,757,951 (Redenbarger) discloses an inside-out filter having a mechanism to create a bypass. The mechanism includes a compression spring disposed between an exterior of a filter element and an interior of a filter housing. During normal operation, when the filter is in an operational mode, the spring holds the filter element in place over a fluid inlet. The filter element and spring are stabilized relative to each other and relative to the inlet, in part, by a rod extending through both the filter element and spring.

In the operational mode, the fluid flows into the fluid inlet, through the filter element, and out a fluid outlet. However, when the filter element clogs, the fluid exerts force on the filter element. The force exceeds the compression force the spring exerts on the filter element. The filter element thus moves away from the fluid inlet. The movement of the filter element away from the inlet creates the fluid bypass which allows fluid to bypass the filter element and exit the fluid housing outlet without filtration.

The apparatus has disadvantages. First, the bypass mechanism disrupts the flow of the filtered fluid. Also, a user must continually worry about the mechanism's cleanliness. The mechanism may attract debris when the filter moves to the bypass position. If a user fails to clean the debris off the mechanism after changing the filter element, debris may dislodge from the mechanism upon subsequent use of the filter. The debris may damage the machine associated with the filter.

Another disadvantage concerns the burden the mechanism imposes on a user or installer during a change of the filter element. A user must dismantle and reassemble the spring mechanism to change the filter element. The process is cumbersome and may result in the loss of needed parts.

U.S. Pat. No. 3,993,561 (Swearingen) provides another example of a filter having a bypass mechanism. Swearingen, like Redenbarger, holds the filter element in place with a compression spring. The compression spring is between an exterior of the filter element and an interior of the housing. Swearingen has a plurality of fluid outlets coaxially surrounding the spring. Swearingen, however, still requires a central outlet. The spring mechanism is between the central outlet and the filter element. Thus, the spring would appear to disrupt fluid traveling from the filter element to the outlet.

Swearingen's mechanism has the drawback of clumsy installation. A user has to remove and reinstall the spring after each change. Additionally, sediment could build up on the spring when the filter element is in the bypass position. The sediment could come loose upon subsequent use of the filter. The loose sediment could damage the machine associated with the filter. Additionally, the filter element only has a spring stabilizing its one end. The filter element thus may suffer from wobble as fluid flows.

Some have tried to solve the problems of clumsy installation and fluid disruption by developing filter elements having built-in release valves. U.S. Pat. No. 4,689,144 discloses an example of a filter element with a built-in release valve. The built-in release valve, however, has the drawback of increasing the cost of the disposable filter element.

SUMMARY

The present invention desires to provide a filter through which fluid can continue to flow even when its filter element becomes clogged. The filter should not require a filter element which has a built-in release valve. The filter should not require an installer to remove and reinstall a compression spring when changing the filter element. Further, the filter's bypass mechanism should inhibit debris which dislodges from a compression spring or another compression portion of the mechanism from flowing into an associated machine. The filter obtains the above features by providing an adjustable support that connects a filter element to a filter housing. The adjustable support has a first end fixedly mounted to an interior of the first housing member. The first end is mounted at a fluid inlet end of the first housing member. The adjustable support has a movable portion opposite the first end. The movable portion is connected to a fluid-inlet-facing surface of a closed end of the filter element. The movable portion adjusts from a first position to a second position. The filter element is in a bypass position when the movable portion is in the second position. The filter element is in a fluid intake position when the movable portion is in the first position. A compression spring regulates adjustment of the movable portion between the first and second positions. A throat of the filter element encompasses the movable portion and compression spring.

Accordingly, the present invention has a filter housing made of first and second housing members. A fluid inlet opens into the first housing member and a fluid outlet opens out of the filter housing.

An adjustable support has a first end which is fixedly coupled to the first housing member. The support has a movable portion opposite the first end. The movable portion moves relative to the first housing member. The movable portion is in a first position when the filter element is operationally coupled to the filter housing and the filter element is in a fluid intake position. The movable portion is in a second position when the filter element is operationally coupled to the housing and in a bypass position. The movable portion moves from the first position to the second position when the filter element is operationally coupled to the housing and a fluid force moves the filter element from the fluid intake position to the bypass position. The movable portion is also disposed in a throat of the filter element when the filter element is operationally coupled to the housing.

BRIEF DESCRIPTION OF THE DRAWINGS

FIG. 7 discloses a cross-sectional view of an alternative embodiment of an assembled filter which is the subject of the present invention, the view is shown from the same view as FIG. 3.

FIG. 8 discloses a top side perspective view of a cylindrical member which forms a portion of the adjustable support shown in FIG. 7.

FIG. 9 discloses a close-up top side perspective view of an alternative embodiment of a filter housing; the housing incorporates a band clamp.

DETAILED DESCRIPTION

Figure 1:
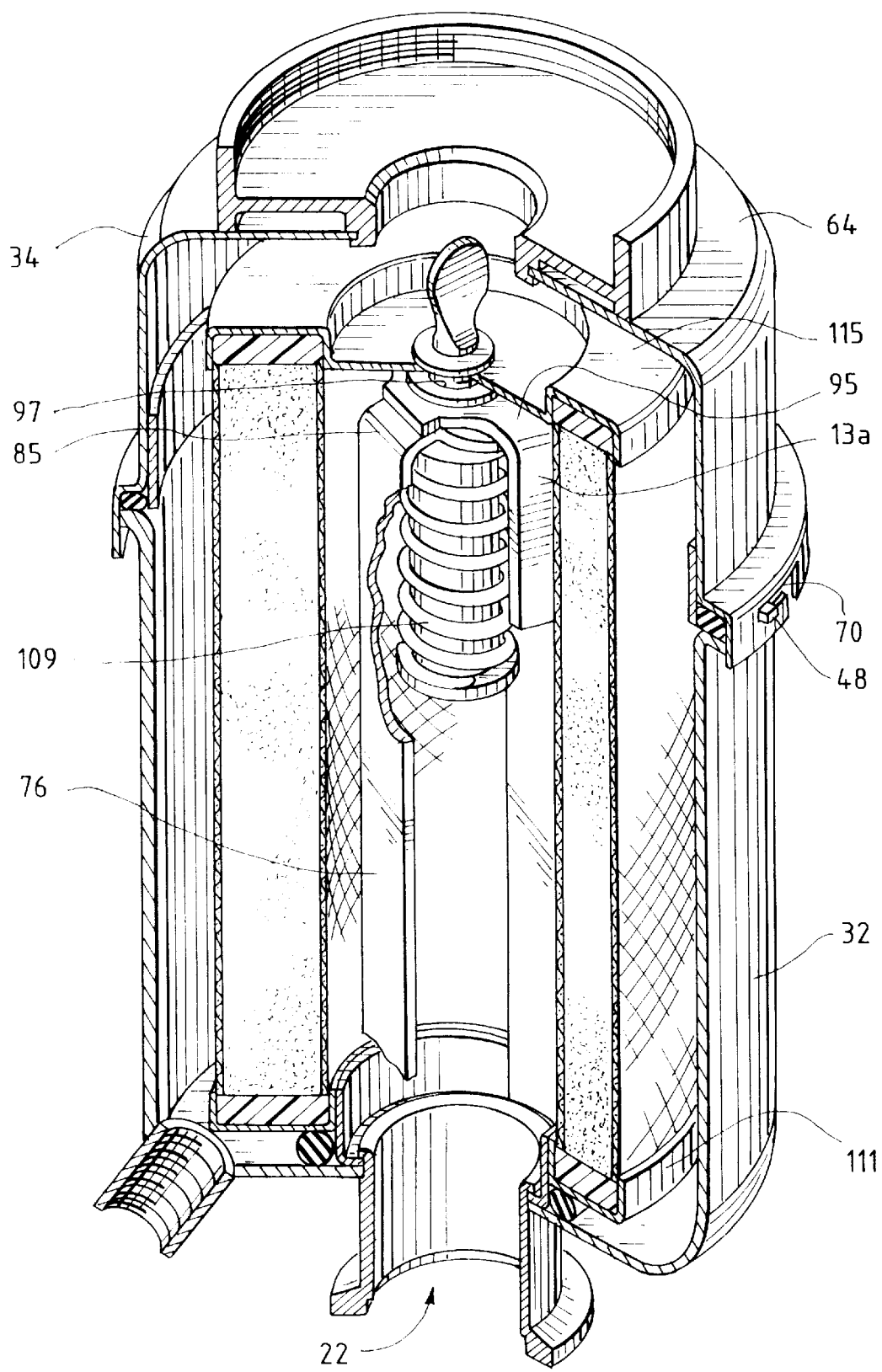
FIG. 1 discloses a top side perspective cutaway view of the assembled filter having a filter housing, adjustable support and filter element.
Figure 2:
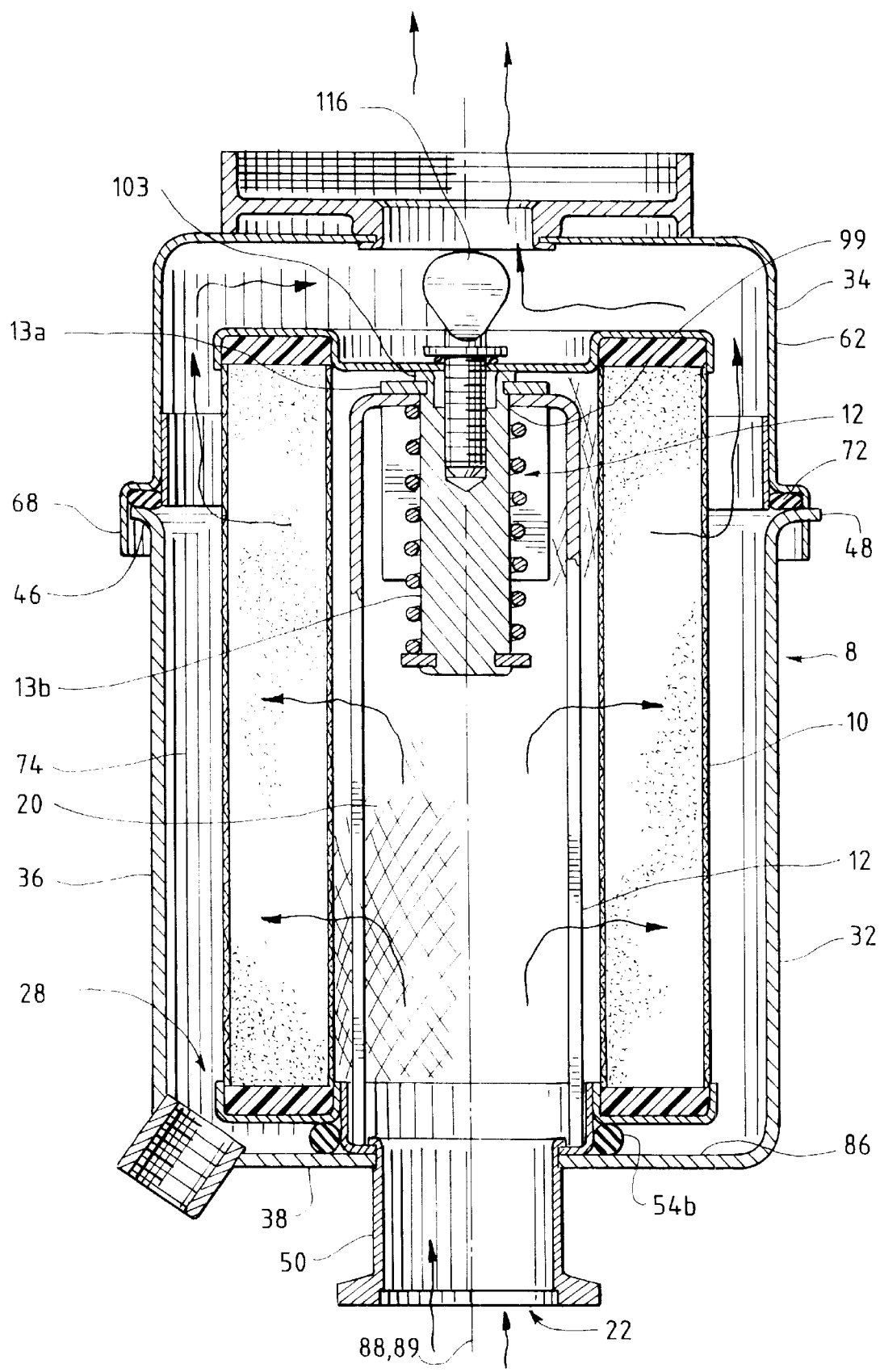
FIG. 2 discloses a cross-sectional view of an assembled filter, which is the subject of the present invention, having a filter housing, adjustable support and filter element; the view is taken along the filter's major access; the filter element occupies a fluid intake position.

Referring to FIGS. 1–4, the filter of the present invention includes a filter housing 8, a filter element 10, and an adjustable support 12. The adjustable support connects the filter element to the filter housing. The support 12 has a movable portion 13a, 13b; the movable portion adjusts to a second position (FIG. 3) from a first position (FIGS. 1, 2). The movable portion in the first position is axially closer to a fluid inlet 22 than when in the second position. The filter element is in a fluid intake position (FIGS. 1, 2) when the movable portion 13a, 13b is in the first position. The filter element, in the fluid intake position (FIGS. 1, 2), has its throat 20 fluidly coupled to the filter housing fluid inlet 22. The fluid coupling allows the filter element to receive fluid in its filter element throat 20. The fluid, when received, passes through the filter element and exits the filter through a filter housing outlet 24.

Figure 3:
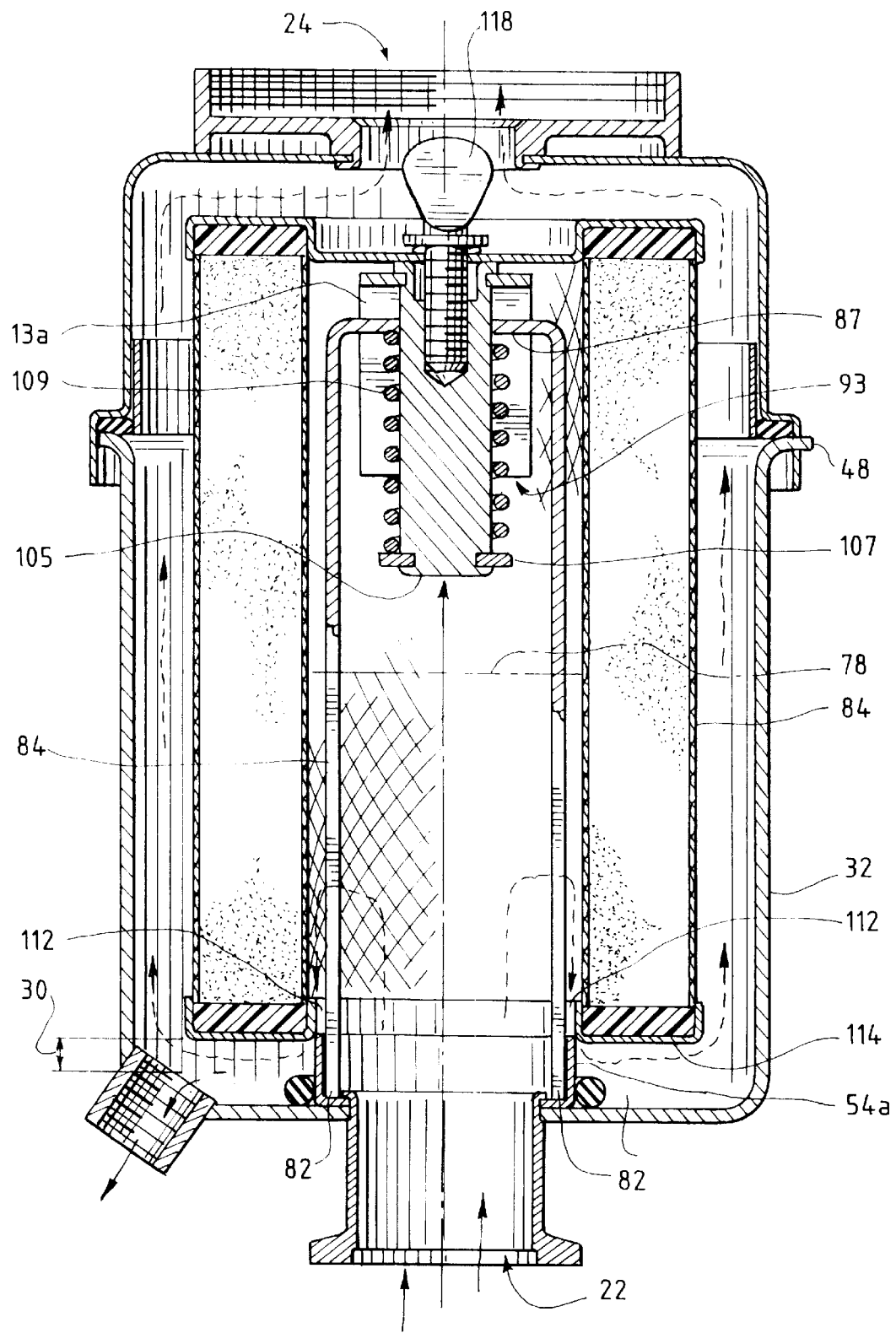
FIG. 3 discloses the same cross-sectional view as shown in FIG. 1, except the filter element occupies the bypass position.
Figure 4:
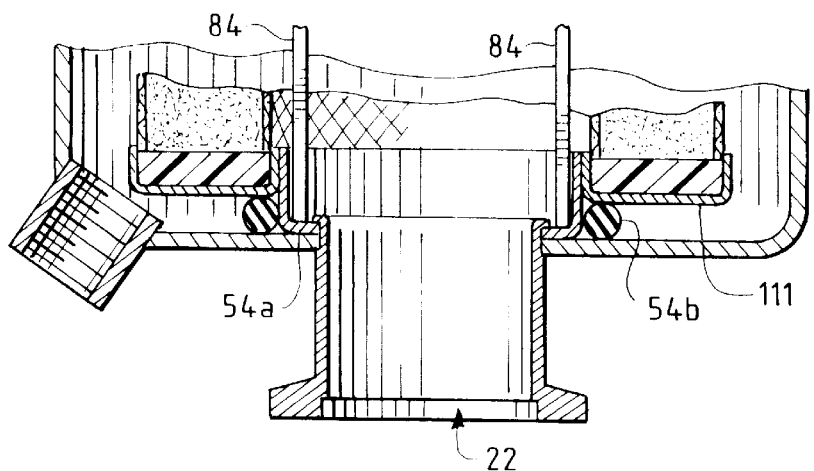
FIG. 4 discloses a close-up cross-sectional view of the bottom portion of the filter shown in FIG. 2.

The filter element 10 moves from the fluid intake position to a bypass position (FIG. 3) as the movable portion adjusts from the first position to the second position (FIG. 3). In the bypass position the filter element has its open end 28 axially spaced from the fluid inlet 22. The axial spacing creates a bypass 30 to allow the fluid to exit the filter without passing through the filter element 10. The described filter is an inside-out filter.

The filter housing 8 includes a first housing member 32 and a second housing member 34. The first housing member 32 has a cylindrical side wall 36 and an end wall 38 integral with the side wall. The interior surface of the cylindrical wall and the interior surface of the end wall define a hollow. The end wall 38 has the fluid inlet 22. The first housing member 32 has a mouth axially opposite the inlet. The mouth has a circumferencial lip 46. Flanges 48 extend radially outward from the lip.

The fluid inlet 22 has an exterior portion 50 which connects to a fluid supply member (not shown). An interior portion of the fluid inlet has a sealing assembly 54a, 54b to fluidly connect the filter element open end 28 to the fluid inlet 22. The sealing assembly apparatus includes a cylindrical ring 54a circumferentially disposed around a periphery of the interior portion of the fluid inlet. The ring 54a extends away from the inlet and toward the first housing member's mouth. The sealing assembly also includes a gasket 54b coaxially disposed around the cylindrical ring.

The filter housing has a second housing member 34. The second housing member also has a cylindrical side wall 62 and a second housing member end wall 64. The end wall 64 has the fluid outlet 24. The second housing member has a mouth opposite the inlet. The mouth includes a portion of the cylindrical wall 68 that has an extended diameter. This portion of the wall has notches 70 therein.

The first housing member 32 is coupled to the second housing member 34 by disposing the portion of the closure wall having the extended diameter 68 coaxially around the lip 46. The first and second housing members are then rotated relative to each other so that the flanges 48 on the lip interlock with the notches 70. An o-ring seal 72 can be disposed between the first housing member lip 46 and the second housing member mouth to help seal the first housing member to the second housing member. The second housing member and first housing member lock together and form an interior surface which defines a filter hollow 74.

The filter element 10 and the adjustable support 12 are both disposed within the filter hollow 74. The adjustable support includes a first u-shaped bracket 76. The u-shaped bracket has a minor axis 78 slightly greater than the diameter of the fluid inlet 22. The u-bracket's minor axis is slightly smaller than the diameter of the cylindrical ring 54a. An open end of the u-bracket is fixedly mounted to an interior portion of the cylindrical ring. The bracket is mounted so that the bracket ends 82 border a periphery of an interior portion of the fluid inlet 22. The cylindrical ring 54a coaxially surrounds the u-bracket ends 82.

The arms 84 of the u-bracket space the u-bracket ends 82 from a u-bracket closed end 85. The u-bracket arms 84 space the closed end 85 between four and five inches axially away from an interior surface of the first housing member end wall 86. The arms place the u-bracket closed end 85 axially above the fluid inlet. The u-bracket's major axis 88 extends in the same direction as the filter housing's major axis 89, and the axes are in alignment or near alignment. A second u-shaped bracket 13a oriented with its open end 93 facing toward the fluid inlet sits atop the first u-bracket 76. The second u-bracket closed end 95 has a hole 97 aligned with a hole 99 in the first u-bracket closed end 85.

The adjustable support further includes a lug 13b which has a first end 103 and a second end 105. The second end has a lug head 107. The lug first end 103 extends through both the first u-bracket closed end hole 99 and the second u-bracket closed end hole 97. The lug is adjustable relative to the first u-bracket and the filter housing. The lug 13b is rotatable relative to the first u-bracket 76 and filter housing 8. The lug also adjusts axially relative to the first u-bracket 76 and filter housing 8 in a direction along the filter housing major axis 89. The lug adjusts axially by further extending through the first u-bracket closed end hole 99, away from the first housing member end wall 38, and towards the second housing member end wall 64.

The lug first end 103 is fixedly connected to the second u-bracket closed end 95. The second u-bracket 13a prevents the lug from over-rotating. Further, the second u-bracket 13a maintains the lug first end 103 extended through the first u-bracket closed end hole 99. The second u-bracket 13a and the lug 13b form the movable portion 13a, 13b. A compression spring 109 is disposed around the lug 13b between the lug head 107 and a surface of the first u-bracket closed end. The surface 87 faces towards the first housing member end wall.

The filter element open end 28 has an adapter end cap 111. The end cap 111 defines an aperture 112 which leads into the filter's throat 20. The aperture has a diameter slightly bigger than the diameter of the cylindrical ring 54a. In the fluid intake position, the cylindrical ring 54a is disposed within the aperture 112 so that the adapter end cap 111 coaxially surrounds the cylindrical ring 54a when the filter element is in the fluid intake position. An end surface 114 of the adapter cap 111 abuts up against the butterfly gasket 54b. The filter element closed end 115 is disposed above the adjustable support movable portion 13a, 13b.

A screw 116 connects the filter element to the adjustable support. The screw connects lug 13b to filter element closed end 115. The screw's head 118 sits on an exterior of the filter element closed end 115. The threads of the screw are coupled to a screw hole disposed in the lug first end 103. Prior to a tightening of the screw to secure the lug 13b to the filter element closed end 115, an axial space separates the filter element closed end from the movable portion 13a, 13b.

As an installer tightens the screw, a force acts upon the lug 13b in a direction away from the first housing member end wall 38 and toward the second housing member end wall 64. A resistive force caused by the compression spring opposes the force acting on the lug. The resistive force of the compression spring 109 causes the adapter end cap 111 to move towards the butterfly gasket 54b as an installer tightens the screw. The movement causes the butterfly gasket to compress. The adapter end cap ceases moving towards the butterfly gasket when the resistive force of the gasket 54b exceeds the resistive force of the compression spring.

An installer stops tightening the screw when the resistive force on the lug 13b exceeds a force imparted upon the screw 116 by the installer. Tightening the screw to a stopping point will result in a seal forming between the filter element open end 28 and the filter housing fluid inlet 22. The seal allows fluid to flow from the inlet 22 into the filter element throat 20 without first escaping into the filter hollow 74. The fluid, after passing into the filter element throat 20, passes through a filter mesh, enters the filter hollow 74, and exits the filter housing fluid outlet 24.

When the filter element becomes clogged, the force of the fluid acting upon the filter element exceeds the resistive force of the spring 109 holding the filter element in the fluid intake position. The filter element 10 thus moves in a direction along the filter housing's major axis 89 towards the second housing member end wall 64. As the filter element moves: lug 13b attached to filter element 10 moves in the same direction as the filter element 10; the compression spring 109 compresses between the lug head 107 and the surface 87 of the first u-bracket closed end which faces towards the first housing member end wall; and a gap forms between the sealing assembly 54a, 54b and the adapter end cap 111. The gap creates a fluid bypass that allows the fluid which passes through the fluid inlet 22 to bypass the filter element 8 and exit the housing outlet 24. The filter is operationally connected to the filter housing when the filter element is adjustable to a bypass position from a fluid intake position.

Figure 5:
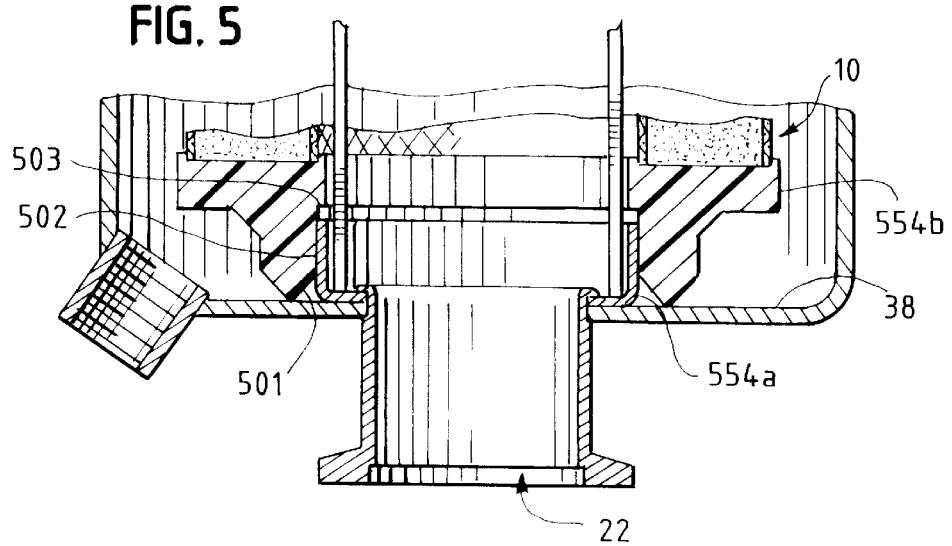
FIG. 5 discloses a first alternative embodiment of the sealing apparatus shown in FIG. 4; the view is shown from the same perspective as FIG. 4.
Figure 6:
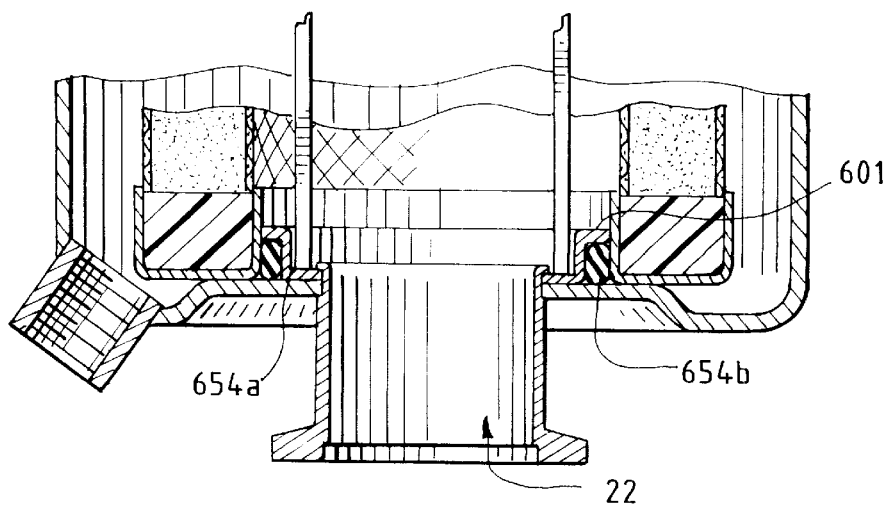
FIG. 6 discloses a second alternative embodiment of the sealing apparatus shown in FIG. 4; the view is shown from the same perspective as FIG. 4.

FIGS. 5 and 6 disclose alternative embodiments of the sealing assembly apparatus. The sealing assembly 554a, 554b of FIG. 5 uses a molded end seal 554b rather than the gasket 54b as shown in FIG. 2. The molded end seal 554b replaces adapter end cap 111. The molded end seal is molded to the open end of filter element 10. The molded end seal has a bottom portion 501, a radially inward facing surface 502 and a fluid inlet facing surface 503. The fluid inlet facing surface and the radially inward facing surface form a shoulder. When filter element 10 sits in the fluid intake position, the bottom portion 501 abuts up against the first housing member end wall interior surface 38; and the radially inward facing surface 502 abuts up against a radially outward facing surface of cylindrical ring 554a.

FIG. 6 shows yet another alternative embodiment of the sealing assembly. The sealing assembly 654a, 654b in FIG. 6 provides a diametrical seal. The cylindrical ring 654a in FIG. 6 has a shoulder 601. The shouldered cylindrical ring acts as a o-ring saddle to stabilize o-ring 654b. It is believed the diametrical seal provided by sealing assembly 654 is preferred.

FIG. 7 discloses an alternative assembled filter with its filter element 710 in the fluid bypass position. The filter in FIG. 7 has a molded end seal 754b similar to the seal shown in FIG. 5. The filter includes an adjustable support 712 which differs in construction than the adjustable support shown in FIGS. 1–4. Adjustable support 712 includes a bi-diametrical cylindrical member 776a, 776b. A first portion 776a of the member has a greater diameter than a second portion 776b of the cylindrical member. The cylindrical member first portion has four equidistantly spaced longitudinal openings 701. Cylindrical member first portion 776a retains spring loaded lug 713b. The cylindrical member second portion 776b fits within sealing assembly cylindrical ring 754a. Adjustable support 712 has a lug 713b. Lug 713b has a spring abutment portion 7107 opposite a portion of the lug which receives thumb screw 7116. The lug 713b has an end portion 7105. Between the lug end portion and the lug spring abutment portion, extends two transversely running tunnels 702. The tunnels intersect.

The tunnels 702 and the longitudinally extending openings 701 support an anti-rotation bar 713a in either of two transversely oriented positions. In FIG. 7, the anti-rotation bar is located in one of the two transversely extending positions.

FIG. 9 discloses an alternative assembly for coupling the first housing member to the second housing member. The coupling assembly 901a, 901b, 901c, 901d includes band clamp 901a. The coupling assembly further includes first housing member lip 901b, second housing member lip 901c and o-ring 901d. The band clamp compresses the o-ring between the first housing member lip and the second housing member lip.

The filter and embodiments of the present invention utilizes an adjustable support in a manner which allows fluid flowing between the filter element and housing to exit through the outlet without having to turn its way around a large adjustable support mechanism prior to passing through the outlet. Reducing the intrusiveness of the support thus improves fluid flow efficiency. The positioning of the support further reduces the need to worry about the support's cleanliness. During operation of the filter, the filter element always encompasses the support. Thus, debris dislodged from a dirty support will more likely remain trapped and not flow into the machine.

Another advantage of the adjustable support concerns the ease with which an installer can connect the support to a filter element. An installer only has to slide the filter element over the support and turn a thumb screw. Previous mechanisms required an installer to actually remove the spring from the filter and reinstall the spring with the filter element. Reinstalling requires cumbersome manipulations of the spring in combination with the filter element.

It is important to note that the present invention has been described with reference to an example of an embodiment of the invention. The specifications and drawings are therefore to be regarded in an illustrative rather than a restrictive sense. It would be apparent to those skilled in the art that a person understanding this invention may conceive of changes or other embodiments or variations which utilize the principles of the invention without departing from the broader spirit and scope of the invention as set forth in the appended claims. All are considered within the spirit and scope of the invention. Accordingly, it is not intended that the invention be limited except as may be necessary in view of the appended claims.

What is claimed is:

1. A filter housing having an adjustable support, said adjustable support adjustably coupling said housing to a filter element, said filter housing having said adjustable support comprising:

a first housing member forming part of said filter housing;

a second housing member forming part of said filter housing;

a fluid inlet opening into said first housing member;

a fluid outlet opening out of said filter housing;

a first end of said adjustable support fixedly coupled to said first housing member;

a movable portion of said support movable relative to said first housing member, said movable portion opposite said first end;

said movable portion having a first position, said movable portion being in said first position when said filter element is operationally coupled to said filter housing and said filter element is in a fluid intake position;

said movable portion having a second position, in said second position said movable portion having a different spatial relationship with said housing compared to when in said first position, said movable portion being in said second position when said filter element is operationally coupled to said housing and said filter element is in a bypass position, and wherein said movable portion moves from said first position to said second position when said filter element is operationally coupled to said housing and a force from a fluid moves said filter element from said fluid intake position to said bypass position, and wherein said movable portion is disposed in a throat of said filter element when said filter element is operationally coupled to said housing; and said moveable portion exerts a resistive force, said force biasly positions said filter element in said first position when said filter element is operationally coupled to said housing.

2. A filter housing having an adjustable support, said adjustable support adjustably coupling said housing to a filter element, said filter housing having said adjustable support:

a first housing member forming part of said filter housing;

a second housing member forming part of said filter housing;

a fluid inlet opening into said first housing member;

a fluid outlet opening out of said filter housing;

a first end of said adjustable support fixedly coupled to said first housing member;

a movable portion of said support movable relative to said first housing member, said movable portion opposite said first end;

said movable portion having a first position, said movable portion being in said first position when said filter element is operationally coupled to said filter housing and said filter element is in a fluid intake position, said movable portion having a second position, in said second position said movable portion having a different spatial relationship with said housing compared to when in said first position, said movable portion being in said second position when said filter element is operationally coupled to said housing and said filter element is in a bypass position, and wherein said movable portion moves from said first position to said second position when said filter element is operationally coupled to said housing and a force from a fluid moves said filter element from said fluid intake position to said bypass position, and wherein said movable portion includes a compression spring, and wherein said compression spring is disposed in a throat of said filter element when said filter element is operationally coupled to said housing.

3. The filter housing and adjustable support of claim 2 wherein a portion of said movable portion is coupled to a closed end of said filter element at a fluid-inlet-facing surface of said closed end, when the filter element is operationally coupled to said housing.

4. The filter housing having the adjustable support of claim 2 wherein:

the compression spring is disposed around a movable lug of said movable portion.

5. A filter housing having an adjustable support comprising:

a first housing member forming part of said filter housing;

a second housing member forming part of said filter housing;

a fluid inlet opening into said first housing member;

a fluid outlet opening out of said filter housing;

a first end of said adjustable support fixedly coupled to said first housing member;

a movable portion of said support movable relative to said first housing member, said movable portion opposite said first end;

a longitudinal length defined by said adjustable support;

said movable portion having a first position, said movable portion being in said first position when said filter element is operationally coupled to said filter housing and said filter element is in a fluid intake position;

said movable portion having a second position, in said second position said movable portion having a different spatial relationship with said housing compared to when in said first position, said movable portion being in said second position when said filter element is one rationally coupled to said housing and said filter element is in a bypass position, and wherein said movable portion moves from said first position to said second position when said filter element is operationally coupled to said housing and a force from a fluid moves said filter element from said fluid intake position to said bypass position, and wherein said longitudinal length has a first length when said movable portion is in said first position; and said longitudinal length has a second length when said movable portion is in said second position, and wherein said second length is longer than said first length.

6. A filter comprising:

a filter housing, said housing having a fluid inlet and a fluid outlet;

an adjustable support having a first end and a movable portion, said first end fixedly coupled to said filter, said movable portion opposite said first end;

a filter element disposed is said filter housing, said filter element coupled to a portion of said movable portion;

said movable portion having a first position when said filter element is in a bypass position;

said movable portion having a second position when said filter element is in a fluid intake position, said movable portion in said second position having a different spatial relationship relative to said filter housing compared to when in said first position; and wherein said movable portion is disposed in a throat of said filter element, and wherein:

said moveable portion exerts a resistive force; said force biasly positioning said filter element in said first position when said filter element is operationally coupled to said housing.

7. A filter comprising:

a filter housing, said housing having a fluid inlet and a fluid outlet;

an adjustable support having a first end and a movable portion, said first end fixedly coupled to said filter, said movable portion opposite said first end;

a filter element disposed in said filter housing, said filter element coupled to a portion of said movable portion;

said movable portion having a first position when said filter element is in a fluid intake position;

said movable portion having a second position when said filter element is in a bypass position, said movable portion in said second position having a different spatial relationship relative to said filter housing compared to when in said first position; and wherein said movable portion includes a compression spring disposed in a throat of said filter element.

8. The filter of claim 7 wherein said filter element is an inside-out filter.

9. The filter element of claim 7 wherein:

said compression spring is disposed around a lug of said movable portion.

10. A filter comprising:

a filter housing, said housing having a fluid inlet and a fluid outlet;

an adjustable support having a first end and a movable portion, said first end fixedly coupled to said filter, said movable portion opposite said first end;

a filter housing element coupled to a portion of said movable portion;

a longitudinal length defined by said adjustable support;

said movable portion having a first position when said filter element is in a fluid intake position;

said movable portion having a second position when said filter element is in a bypass position, said movable portion in said second position having a different spatial relationship relative to said filter housing compared to when in said first position; and wherein said movable portion is disposed in a throat of said filter element, and wherein:

said longitudinal length has a first length when said filter element is in said fluid intake position;

said longitudinal length has a second length when said filter element is in said bypass position, and wherein said first length is shorter than said second length.

* * * * *